UNITED STATES PATENT OFFICE.

ROBERT DEISSLER, OF TREPTOW, GERMANY.

COMPOSITION FOR AND METHOD OF HEATING METAL PARTS.

SPECIFICATION forming part of Letters Patent No. 623,239, dated April 18, 1899.

Application filed August 12, 1897. Serial No. 648,044. (No specimens.)

*To all whom it may concern:*

Be it known that I, ROBERT DEISSLER, a subject of the King of Prussia, German Emperor, and a resident of Treptow, near Berlin, in the Kingdom of Prussia, German Empire, have invented a new and useful Composition for and Method of Heating Metal Parts, of which the following is an exact specification.

This invention relates to a method of heating metal pieces which are to be welded or soldered or repaired or shaped in any way, the source of heat being a chemical reaction in which a combustion of a metal or carbid is brought about by means of solid compounds containing oxygen or sulfids or halogenids being used. The substances by the oxidation of which the temperature desired is produced should of course be such that have a high temperature of combustion, and among these substances I have found aluminium, magnesium, and the carbids of the various metals to be the most suitable ones. According to the degree of temperature desired or necessary for this kind or work the above-named substances may be used singly or mixed with each other, and in either case I may employ the substance or substances in connection with carbon or with any suitable material containing carbon. All the substances used are reduced to small pieces before being used.

If an oxid and aluminium are put into reaction, the latter proceeds according to the formulæ given in the following examples:

Example I: $Fe_2O_3 + Al_2 = Al_2O_3 + Fe_2$.

Example II: $2Al_2 + 3BaO_2 = 2Al_2O_3 + 3Ba$.

The reaction is analogous if the oxid is replaced by a sulfid, a halogenid, or a salt of an acid containing oxygen. A mixture of such kind would react about as follows:

Example III:
$CaSO_4 + 5Mg = MgS + 4MgO + Ca$.

The typical point in all these and similar reactions resides in the reaction propagating itself automatically. In other words, if the mixture is ignited at a certain point or place or if the reaction is initiated at a certain point or place of the mixture then the reaction proceeds automatically from that point or place to the neighboring parts, from these again to the neighboring parts, and so on until the reaction has been transmitted to and through the whole quantity of the mixture or mass. The time of reaction may thus be lengthened at will by adding fresh quantities to those being already in reaction, and I prefer to employ for this purpose the mixture or mass in the shape of cubes, prisms, or similar bodies. The degree of temperature resulting from the reaction depends on the kind of components of the mass, and by suitably selecting the components the degree of temperature may be determined at will or according to any requirement. Mixtures of oxids with carbids produce comparatively low temperatures, the reaction between the "carbids" and the "oxids" taking place according to the following formula:

$$BaC_2 + Fe_2O_3 = BaO + 2CO + 2Fe,$$

whereas temperatures similar to that of an electric arc and amounting up to 3,000° may be obtained, for instance, by a mixture of aluminium or aluminium and magnesium with oxid of chromium. 

If a piece of iron—say a rivet or the like—is to be heated, that piece is embedded in the reaction mass, and the latter is ignited at any point or place—for instance, by a blowpipe-flame. After the reaction has propagated to and through the whole mass this latter (which has then turned into a slag) is removed by means of a hammer or other suitable tool, when the rivet will be found white-hot and ready for being worked. A time of forty seconds only is necessary for thus heating a rivet having a weight of about two hundred and fifty grams.

If two pieces of metal are to be connected by soldering, the respective two parts or ends are first brought in contact with each other, and the solder is then applied in the known way. To prevent the solder from flowing away after being melted, it is preferably surrounded by a small dam or ring of some fireproof material. The two pieces after thus being prepared are embedded in the reaction mass, or the latter is cast over said two parts or ends, and the mass is then ignited. When the reaction has been finished and the slag removed, it will be found that the said parts or ends have become soldered in a most perfect manner. In this way flanges, for instance, may be fixed to tubes or pipes or pipes may be secured to the walls of a boiler or the like, and in very much the same way faulty places of a piece or part of welded, rolled, or cast iron or other metal may be repaired. This is effected by letting flow upon or into the faulty place a molten metal or alloy of a kind or composition equal to that of the respective piece or part.

Some of the metal or alloy of which the device or tool to be repaired is made may be added to the heat-producing mixture, or a reaction mass may be employed, from which the desired metal or alloy is separated in the course of the reaction.

Suppose a cleft in a sheet of iron shall be closed. Then a small dam of some fireproof material is cast around that cleft, and the cavity thus formed is filled up with a mixture of aluminium and oxid of iron. The mixture is then ignited, when by chemical action between aluminium and oxid of iron free molten iron is produced, which fills up the cleft. At the same time the heat produced softens the edges of the cleft sufficiently to effect a perfect union between the molten metal and the edges. If pieces or parts of steel or cast-iron are to be worked in this or a similar manner, the aluminium must receive an addition of carbid of calcium, when carbureted iron will result, and if the iron resulting from the reaction is desired to contain manganese, chromium, silicium, vanadium, or the like these metals may either be admixed as such with the aluminium and oxid of iron, or compounds of the same with oxygen or sulfur may be made use of. In all these and similar cases the mixture may be such that the metal separated is free from aluminium, the latter being not used in excess.

The separated metal may, if desired, be employed for strengthening or reinforcing the repaired pieces or parts or for forming projections and the like upon the same.

My novel method may also be employed for welding purposes—i. e., for heating the pieces or parts to welding temperature—and it may further be used for making a hole or holes in a plate. This is effected by forming a heap or column of the reaction mass upon the place where the hole is to be formed, igniting the mass, and punching a hole through the softened portion of the plate, or the process is continued until the metal is melted perfectly through, so that no punch or similar tool need be used.

Having thus described my invention, I claim—

1. As a novel composition a mass for heating parts of metallic objects composed of a finely-divided metal having a high temperature of combustion and metal carbid capable of acting easily as reducing agent, and a sulfur or oxygen bearing compound containing a metal to be reduced, substantially as described and for the purpose specified.

2. As a novel composition a mass for heating parts of metallic objects composed of finely-divided metallic aluminium and carbid of calcium acting as reducing agent, and a sulfur or oxygen bearing compound containing a metal to be reduced, substantially as described.

3. The process of heating parts of metallic objects consisting in embedding them in a reaction mass composed of a finely-divided metal having a high temperature of combustion, metal carbid, and an oxygen or sulfur bearing compound, igniting the mass and after the reaction has propagated itself through the whole mass removing the slag formed thereby, as specified.

4. The process of heating parts of metallic objects consisting in embedding them in a mass of finely-divided metallic aluminium, carbid of calcium, and a sulfur or oxygen bearing metallic compound, igniting the mass and after the reaction has propagated itself through the whole mass removing the slag formed thereby, as specified.

In testimony whereof I have signed this specification in the presence of two subscribing witnesses.

ROBERT DEISSLER.

Witnesses:
W. HAUPT,
HENRY HASPER.